(12) United States Patent
Goergen et al.

(10) Patent No.: US 11,116,060 B2
(45) Date of Patent: Sep. 7, 2021

(54) PRESENCE SIMULATION SYSTEM AND METHOD

(71) Applicant: SIGNIFY HOLDING B.V., Eindhoven (NL)

(72) Inventors: Daniel Marin Goergen, Eindhoven (NL); Remco Magielse, Tilburg (NL); Leendert Teunis Rozendaal, Valkenswaard (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 242 days.

(21) Appl. No.: 16/305,156

(22) PCT Filed: May 23, 2017

(86) PCT No.: PCT/EP2017/062349
§ 371 (c)(1),
(2) Date: Nov. 28, 2018

(87) PCT Pub. No.: WO2017/207333
PCT Pub. Date: Dec. 7, 2017

(65) Prior Publication Data
US 2020/0323069 A1    Oct. 8, 2020

(30) Foreign Application Priority Data

May 31, 2016  (EP) .................................. 16172068

(51) Int. Cl.
*H05B 47/16* (2020.01)
*H05B 47/155* (2020.01)
(Continued)

(52) U.S. Cl.
CPC ............. *H05B 47/16* (2020.01); *G05D 25/02* (2013.01); *H05B 47/115* (2020.01); *H05B 47/155* (2020.01)

(58) Field of Classification Search
CPC .... H05B 47/16; H05B 47/115; H05B 47/155; G05D 25/02; Y02B 20/40
See application file for complete search history.

(56) References Cited

U.S. PATENT DOCUMENTS 6,263,260 B1    7/2001  Bodmer et al.
6,377,858 B1 *  4/2002  Koeppe ................ G08B 15/002
                                                                700/12

(Continued)

FOREIGN PATENT DOCUMENTS

WO    WO 2010/079388    *  7/2010

*Primary Examiner* — Alexander H Taningco
*Assistant Examiner* — Pedro C Fernandez

(57) ABSTRACT

A presence simulation system comprises a user interface (32), a profile generator (34) and a presence simulator (35). The profile generator (34) is configured to generate in electronic storage a plurality of virtual occupant profiles (22) according to profile creation inputs received via the user interface (32), each virtual occupant profile comprising user-defined virtual occupant identity data. The presence simulator (35) is configured to generate a sequence of simulated control actions, by applying a behaviour simulation algorithm to the user-defined virtual occupant identity data of the electronically-stored virtual occupant profile. A lighting controller (40) configured to vary at least one characteristic of light emitted by at least one luminaire according to the sequence of simulated control actions.

12 Claims, 4 Drawing Sheets

(51) Int. Cl.
*G05D 25/02* (2006.01)
*H05B 47/115* (2020.01)

(56) References Cited

U.S. PATENT DOCUMENTS

| | | | |
|---|---|---|---|
| 8,751,432 B2* | 6/2014 | Berg-Sonne | G05B 15/02 706/48 |
| 9,043,163 B2* | 5/2015 | Mezic | G01R 19/00 702/24 |
| 2012/0066168 A1 | 3/2012 | Fadell et al. | |
| 2014/0114484 A1* | 4/2014 | Yamada | G08C 23/04 700/275 |
| 2014/0266669 A1 | 9/2014 | Fadell et al. | |
| 2015/0061859 A1 | 3/2015 | Matsuoka et al. | |
| 2015/0160636 A1 | 6/2015 | McCarthy, III et al. | |

* cited by examiner

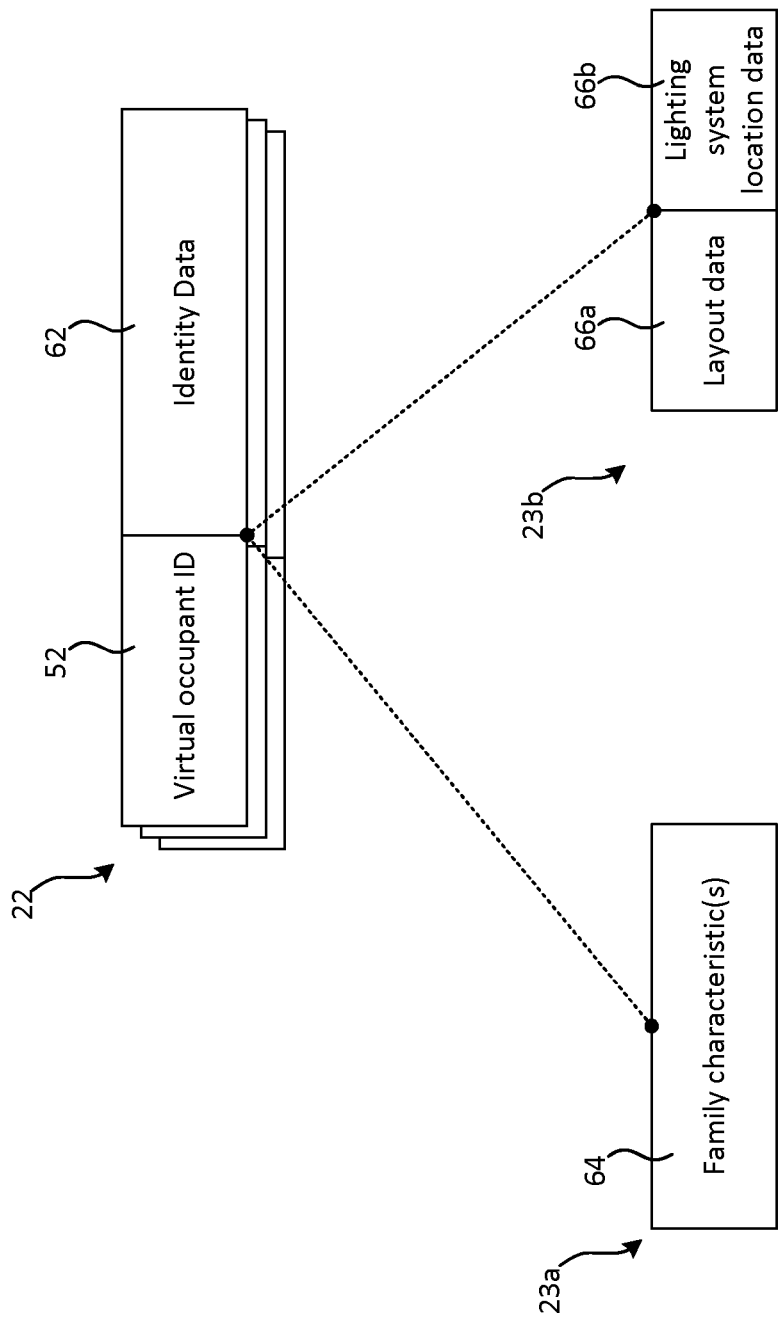

PRESENCE SIMULATION SYSTEM AND METHOD

CROSS-REFERENCE TO PRIOR APPLICATIONS

This application is the U.S. National Phase application under 35 U.S.C. § 371 of International Application No. PCT/EP2017/062349, filed on May 23, 2017, which claims the benefit of European Patent Application No. 16172068.5, filed on May 31, 2016. These applications are hereby incorporated by reference herein.

TECHNICAL FIELD

The present invention relates to presence mimicking, i.e. controlling a lighting system in an unoccupied environment such that, to an external (and potentially nefarious) observer, the environment appears to be occupied.

BACKGROUND

The term "presence mimicking" in the present context means using a lighting system to create the impression of an unoccupied environment (a home in particular) being occupied. That is, automatically applying different lighting settings to the lighting system over time, such that the environment appears to an external observer to be occupied by at least one user (occupant), even though it is not.

Presence mimicking can reduce the chances of someone breaking and entering a user's home, thus providing security. If burglars believe that someone is at home—for which lighting provides an important indication—they will often not attempt to enter the home. For instance, often burglary occurs during the evening or night, rather than in broad daylight; if the house is completely dark throughout the evening, this indicates absence to the burglars. Thus, mimicking presence by lighting, for example by automatically turning one or more lights on for an interval during the evening, can be an effective way to prevent burglary.

Rudimentary presence mimicking devices, which switch a lamp on and off according to a user-defined schedule have been available for some time. More modern "smart lighting" systems (also known as connected lighting), in which the lighting are controlled using modern network technology (e.g. ZigBee, Bluetooth, Wi-Fi, Ethernet etc.), have also seen the incorporation of similar presence mimicking functionality.

SUMMARY

A problem with existing techniques based on schedules is that they can easily be observed over time, i.e. it is easy to distinguish, though observation, schedule-based presence simulation from actual occupancy where a regular schedule is being used. It is possible to randomize such schedules using a suitably programmed computer, but even in that event detectable patterns may still be exhibited. Thus, even randomized patterns may be detectable after a while, i.e. as being simulated patterns rather than actual presence.

One solution to this problem of predictability might be to provide a user with an advanced array of scheduling options, which he can adjust in order to set more complex and realistic schedules presence mimicking schedules for his home (e.g. different schedules for different part of the week, for different parts of the home etc.). However, a drawback is that significantly increases the burden placed on the user, as it requires the user to accurately and precisely determine and then model the normal behaviour of his lighting system, by setting the schedules accordingly. Moreover, with the additional complexity, the chances of the user making an error in defining the complex schedules increase significantly, which could in turn lead to sociably unrealistic behaviour when the schedules are followed.

With this in mind, the present invention provides an alternative solution to this problem of predictability, which does not suffer from these drawbacks. The solution of the present invention shifts the role of the user away from one of modelling the behaviour of the lighting system (i.e. away from explicitly defining schedules) to one of modelling the occupants (e.g. his family) of an environment (e.g. his home) instead, which he does by defining virtual occupant identity data in a virtual occupant profile(s). Presence mimicking is effected by applying artificial intelligence (AI) behaviour simulation to the user-defined virtual occupant identity data, in order to automatically model the behaviour of a virtual occupant(s) having an identity that is determined by the virtual occupant identity data. This is a novel form of presence mimicking referred to herein as "presence simulation".

A first aspect of the present invention is directed to a presence simulation system comprising: at least one luminaire; a user interface; a profile generator configured to generate in electronic storage at least one virtual occupant profile according to profile creation inputs received via the user interface, the profile comprising user-defined virtual occupant identity data; a presence simulator configured to generate a sequence of simulated control actions, by applying a behaviour simulation algorithm to the user-defined virtual occupant identity data of the electronically-stored virtual occupant profile; and a lighting controller configured to vary at least one characteristic of light emitted by the at least one luminaire according to the sequence of simulated control actions.

In embodiments, the profile generator may be configured to generate a plurality of virtual occupant profiles in the electronic storage according to the profile creation inputs, each comprising user-defined virtual occupant identity data, wherein a sequence of simulated control actions is generated for each of the virtual occupant profiles, according to which the at least one light characteristic is varied.

An advantage of the present invention is that the user need not concern himself with how any real-world occupants actually use the at least one luminaire—all he need concern himself with are the intrinsic human characteristics of the real-world occupant(s) themselves, by creating a virtual occupant profile to match the identity of each of the real-world occupant(s), i.e. by setting one or more human characteristics of the virtual identity data in a virtual occupant profile to match that of a corresponding real-world occupant. Thus, in the context of a family, rather than modelling the behaviour of the lighting system, the user need only concern himself with modelling his family, which is more intuitive and less error prone. That is, the user defines an identity for a virtual occupant(s), which means he does not have to explicitly define any lighting schedule for the at least one luminaire. For example, in some embodiments, these can be pre-defined personas or pre-defined families of personas (e.g. e.g. "elderly couple", "young couple without kids", "family with 2 teenager kids" etc.) that the user can select from and can then tweak to his personal settings, which is particularly convenient for the user.

The system then applies a behaviour simulation algorithm, i.e. an AI behaviour modelling process, to the user-defined virtual identity data in each virtual occupant profile, in order to simulate the behaviour of a virtual occupant. AI behaviour simulation is known in the art, for example in the field of computer gaming. The present invention constitutes a novel application of AI behaviour simulation, to simulate interactions between a virtual occupant(s), i.e. a computer-implemented intelligent agent, and a lighting system (comprising at least one luminaire) thereby generating the sequence of simulated control actions. Based on this AI simulation, light emitted by the at least one luminaire of the lighting system is varied when an environment illuminated by the lighting system is unoccupied, making it appear to an external observer as if this virtual occupant(s) is actually occupying the environment.

In embodiments, the user-defined virtual occupant identity data in each virtual occupant profile may comprise at least one of the following types of data:
  age data,
  employment status data (e.g. defining working hours, whether the working hours are regular or irregular, shift-work details etc.),
  gender data,
  activity level data (denoting how active the virtual occupant is),
  family member data (defining the virtual occupant's role within a family, e.g. identifying him as a child, parent, grandparent etc.), or
  hobby data (denoting one or more of the virtual occupant's hobbies), for example sports data (denoting one or more sports played by the virtual occupant).
which is used in generating the sequence of simulated control actions.

Applying the behaviour simulation algorithm may comprise generating a sequence (in time) of simulated activities for each virtual occupant profile (i.e. different activities at different times) using its virtual occupant identity data, based on which the (or each) sequence of simulated control actions is generated. For example, each simulated sequence of activities may comprise:
  a simulated dining activity (e.g. breakfast, lunch, dinner etc.),
  a simulated content consuming activity (e.g. watching TV, reading a book etc.),
  a simulated gaming activity,
  a simulated bathroom activity, or
  a simulated rest activity (e.g. sleeping, napping etc.).

Alternatively or in addition, applying the behaviour simulation algorithm may comprise generating a sequence (in time) of simulated occupant locations (i.e. different locations at different times) for each virtual occupant profile using its identity data and a model of an environment (e.g. a home, such as a house or flat, or part of a home) illuminated by the at least one luminaire, based on which the (or each) sequence of simulated control actions is generated. For example, each sequence of simulated occupant locations may be a sequence of occupied rooms of the environment model.

Existing automated systems run the risk of creating unrealistic behaviour, if not properly configured, for example, by turning all of the lights in a house turn on and off at once; normally, lights in one room would be turned off, before turning on lights in another room, and close observer may notice differences in these patterns.

By simulating occupant locations explicitly based on a model of the environment, the system can ensure that only realistic sequences of control actions for the environment in question are simulated, e.g. as would be expected for an occupant walking between rooms of the environment and turning lights on/off as he goes.

In some embodiments, the simulated activity may depend on the current virtual occupant location. That is, for at least a first of the virtual occupant profiles: at least one of the simulated activities in the sequence of simulated activities for the first profile is generated based on the simulated occupant location at a corresponding time in the sequence of simulated occupant locations for the first profile.

When two or more virtual personas are at the same location simultaneously (e.g. in the same room), in some cases each of their respective activities may be unaltered by the presence of the other virtual occupant at the same location (e.g. virtual occupant A watches TV, whilst virtual occupant B reads a book).

However, in other cases, the fact that two virtual occupants are at the same location simultaneously can affect their activities, i.e. the activity of each may be dependent on the presence of the other: for example, an illumination effect for "child playing in room" when alone" and "father playing in room" (when alone—e.g. playing computer game) may be different from the "father and kid playing in room" (present together). That is, to put it in more general terms, to provide more realistic presence simulation, it may be appropriate for the current activity of a virtual occupant to depend not only on his own modelled location but also that of at least one other virtual occupant.

Accordingly, in embodiments, the at least one simulated activity may be generated based on the simulated occupant location for the first profile at that time and the simulated occupant location for a second of the occupant profiles at that time. That is, a virtual occupant's activity may be based not only on his own current location but also on the current location of at least one other virtual occupant (e.g. which may be the same location).

In some cases, more realistic presence simulation can be achieved by simulating the behaviour of only a subset (i.e. one or more but not all) of one or more of the virtual occupants for a given time intervals: for example, for a family, not everyone will necessarily be at home at the same time. Accordingly, the system may be equipped to model a situation in which only a subset of the virtual personas is present.

To this end, applying the presence simulation algorithm may comprise selecting, for each of a plurality of different time intervals, a respective one or more of the virtual occupant profiles, wherein the at least one light characteristic is varied during that time interval based on the respective one or more virtual occupant profiles selected for that time interval.

The presence simulation system may further comprise a family profile generator configured to generate in the electronic storage at least one family characteristic in association with the plurality of virtual occupant profiles, based on which the sequence of simulated control actions is generated.

In this case, as well as setting individual virtual occupant profiles, the user can also adjust an associated "family profile" (i.e. the at least one family characteristic), for example to indicate if the family spends a lot or only few times together (joined diners/breakfasts, joined activities etc.).

A second aspect of the present invention is directed to a computer-implemented method of creating a simulated occupant presence in an unoccupied environment using at least one luminaire therein, the method comprising implementing by a computer system the following steps: generating in electronic storage at least one virtual occupant profile according to profile creation inputs received from a user via a user interface, the profile comprising user-defined virtual occupant identity data; generating a sequence of simulated control actions, by applying a behaviour simulation algorithm to the virtual occupant identity data of the electronically-stored virtual occupant profile; and causing at least one characteristic of light emitted by the at least one luminaire to be varied according to the sequence of simulated control actions.

In embodiments of the second aspect, any feature of any embodiment of the first aspect may be implemented.

A third aspect of the present invention is directed to a computer system configured to implement the method of the second aspect or any embodiment thereof.

A fourth aspect of the present invention is directed to a computer program product comprising code stored on a computer readable storage medium and configured when executed to implement the method of the second aspect or any embodiment thereof.

A fifth aspect of the present invention is directed to a computer system for controlling a lighting system comprising at least one luminaire, the computer system comprising: a profile generator configured to generate in electronic storage at least one virtual occupant profile according to profile creation inputs received via a user interface, the profile comprising user-defined virtual occupant identity data; and a presence simulator configured to generate a sequence of simulated control actions for controlling the at least one luminaire, by applying a behaviour simulation algorithm to the user-defined virtual occupant identity data of the electronically-stored virtual occupant profile; wherein the computer system is configured to cause at least one characteristic of light emitted by the at least one luminaire to be varied according to the sequence of simulated control actions.

BRIEF DESCRIPTION OF FIGURES

For a better understanding of the present invention, and to show how the same may be carried into effect, reference is made to the following figures in which:

FIG. 4 shows a schematic representation of a virtual occupant profile, and an associated family profile and environment model.

DETAILED DESCRIPTION OF EXAMPLE EMBODIMENTS

Figure 1:
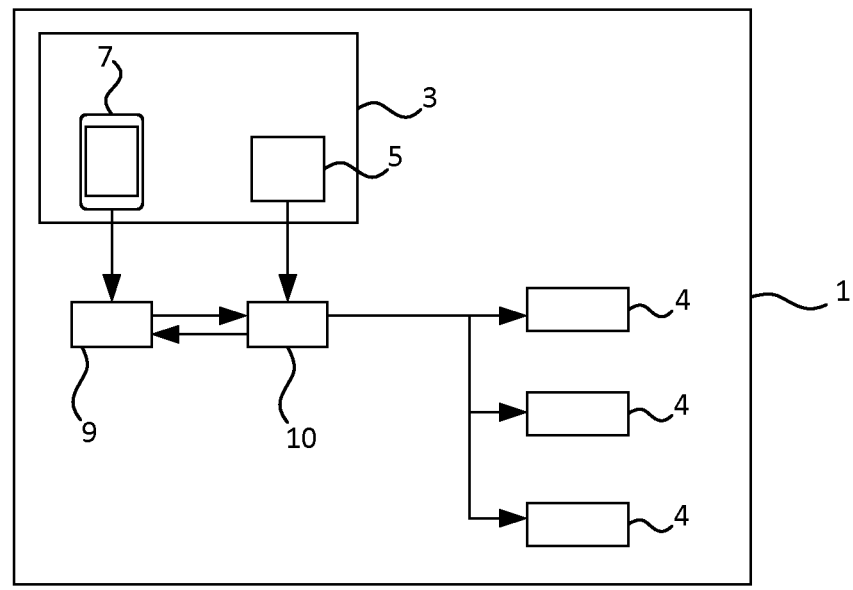
FIG. 1 shows a schematic block diagram of a lighting system.

FIG. 1 shows a schematic block diagram of a lighting system 1.

Figure 2:
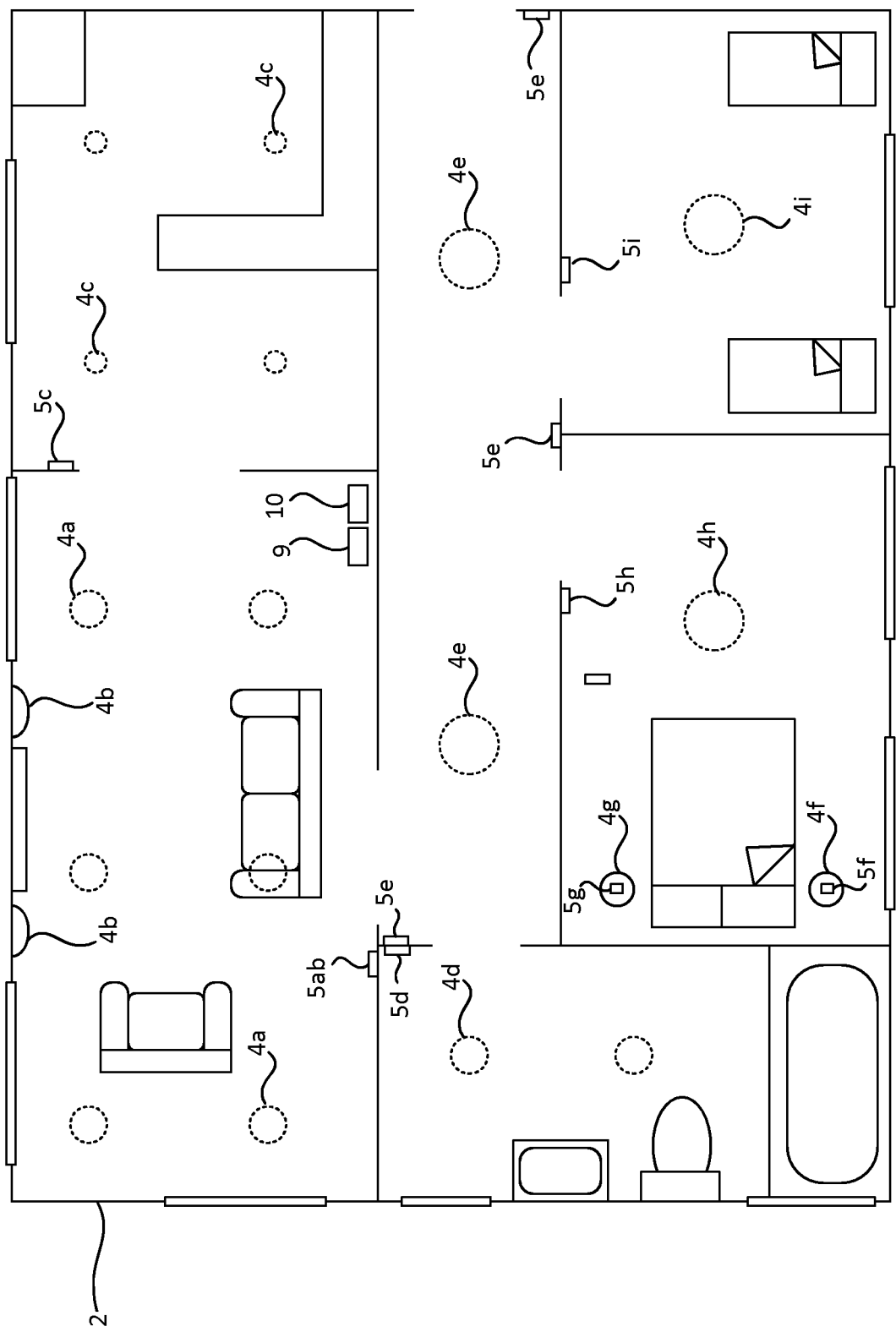
FIG. 2 shows a schematic plan view of an environment, in which a lighting system is installed.

The lighting system 1 comprises a plurality of luminaires 4 arranged to selectively emit light in order to illuminate an environment (2, FIG. 2). Each of the luminaires 4 comprises at least one respective light emitting device such as an LED-based lamp, gas-discharge lamp or filament bulb, plus any associated housing or support. Each of the luminaires 4 may take any suitable form such as a ceiling or wall mounted luminaire, a free standing luminaire (e.g. table lamp, desk lamp or floor lamp etc.), a wall washer, or a less conventional form such as an LED strip, a luminaire built into a surface or an item of furniture, or any other type of illumination device for emitting illumination into the environment 2 so as to illuminate the environment 2.

The lighting system 1 also comprises manual lighting control apparatus 3 for manually controlling the luminaires 4 i.e. which can be used by a user 8 occupying the environment 2 to apply illumination settings to the luminaires 4. In the simplest case, these are straightforward on/off settings. However, using the lighting control apparatus 3 it may in some case be possible to apply more sophisticated illumination settings such as dimming settings, to vary the luminous intensity of the emitted light; colour settings, to vary one or more colour characteristics of the emitted light; or directionality settings, e.g. to a beam width or beam direction of the emitted light.

The luminaires 4 are independently controllable, at least to some extent. The lighting system 1 may be configured such that Illumination settings can be applied to at least one luminaires 4 individually, i.e. independently of any other luminaire; and in some cases, the luminaires 4 may be fully independent (i.e. such that any one of the luminaires 4 can be controlled independently of the rest). Alternatively or in addition, the lighting system may be configured such that the same illumination settings can be applied to sets of two or more of the luminaires 4, e.g. a single switch may turn the set on or off independently of the remaining luminaires. In some cases, this may be the only way to control that set of luminaires (i.e. it may not be possible to use the control apparatus 5 to control a luminaire in a given set independently of the rest of that set); though in other cases, it may be possible to both to apply the same illumination settings to a whole set of luminaires simultaneously, but also to independently control the luminaires within that set should the user 8 wish to do so.

The lighting control apparatus 3 may for example comprise at least one dedicated lighting control device 5, such as a wall panel, e.g. comprising at least one switch such as an on/off switch or dimmer switch; a remote control, for example an infrared or RF (radio frequency) remote control; or a switch that is part of one of the luminaires 4 itself. The lighting control apparatus 5 may also (or alternatively) comprise at least one general purpose user device 7, for example a computer device such as a smartphone, smartwatch, tablet device, laptop computer, or other form of mobile device; or a desktop computer, or other form of fixed device etc. The user 8 can use such a device to control the lighting device using an input device of the user device 7, for example a touchscreen, mouse, trackpad, audio input device (to provide voice input), image capture device or other optical sensor (to provide gesture control) etc. The lighting control apparatus 5 can also comprise other types of device, such as a dedicated voice input device, which may for example be part of a general smart-home control system.

Each device 5, 7 of the lighting control apparatus 3 is referred to generally as a lighting system controller herein. The lighting control apparatus 3 can comprise different types of lighting system controller, e.g. fixed control devices (e.g. wall panel, fixed computer device), portable control device (e.g. dedicated remote control, generic mobile device).

In this example, the lighting control apparatus 3 communicates with the luminaires 4 via a central control node 10, sometimes referred to as a bridge. The bridge 10 is connected to each of the luminaires 4 such that it can transmit control signals to that luminaire. Communication between the bridge 10 and the luminaires 4 can be effected using wireless technology (e.g. ZigBee, Bluetooth, Wi-Fi), wired technology (e.g. Ethernet, DMX) or a combination of wired and wireless technology. An example of a suitable bridge is the Philips Hue Bridge, which is based on wireless ZigBee technology.

In this manner, the luminaires 4 and the bridge 10 form a lighting network, to which the bridge 10 functions as a network gateway. The lighting network can have any suitable topology, for example data may be relayed between the gateway 10 and some of the luminaires 4 via other luminaires 4 of the lighting system 10; or alternatively, the data may communicated between the gateway 10 and every luminaire 4 directly (i.e. without such relaying via other luminaires 4).

A lighting system providing advanced control such as this is sometimes referred to as a "connected lighting" system.

A second network node 9 is shown, via which the user device 7 communicates with the bridge 10. Communication between the second node 9 and the user device 7 may also be effected using wireless technology (e.g. Wi-Fi) or wired technology (e.g. Ethernet), e.g. via a local area network (e.g. TCP/IP network). For example, the second node 9 may comprise a router (e.g. TCP/IP router), to which both the user device 7 and the gateway 10 are connected. In the case that communication between the bridge 10 and the luminaires 4 uses a different network technology (e.g. ZigBee), the bridge 10 functions as a network gateway by translating between the two protocols.

This is just one example, and alternative lighting system architectures are within the scope of the present disclosure. For example, the user device 7 may communicate with the bridge 10 directly instead, e.g. via Bluetooth. As another example, some or all of the lighting control apparatus 3 may communicate with the luminaires 4 directly, e.g. via Bluetooth or Wi-Fi, which does not require a bridge 10.

The second network node 9 also comprises a modem (where the modem and the router may be integrated in the same device, or in separate, connected devices of the second node 9). The modem is configured to connect to an external data network, such as the Internet. This, in turn, allows data to be communicated between the lighting system 1 and the external data network, via the modem of the second node 9, thereby connecting the lighting system 1 to the external data network.

Figure 1A:
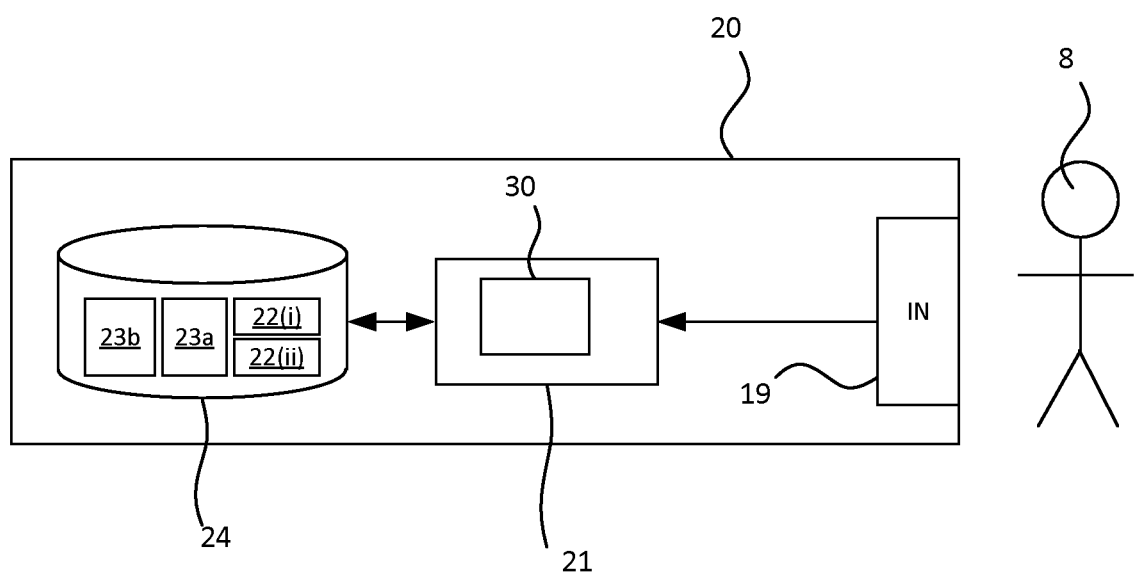
FIG. 1A shows a schematic block diagram of a computer system.

FIG. 1A shows a schematic block diagram of a computer system 20. The computer system 20 comprises at least one processor 21, at least one user input device 19 connected to the at least one processor, and electronic computer storage 24 accessible to the at least one processor 21.

The at least one processor 21 is shown executing behaviour simulation code 30, i.e. the computer system 20 comprises a single processor 21 configured to execute the behaviour simulation code 30, or multiple processors 21 each configured to execute a respective portion of the behaviour simulation code 30. In the case of multiple processors, these may be part of the same device or they may be part of difference devices (which may or may not be spatially located).

The electronic storage 24 holds a plurality of virtual occupant profiles 22(*i*), 22(*ii*); an associated virtual family profile 23*a*; and an associated model 23*b* of the environment 2. These profiles 22(*i*), 22(*ii*), 23*a*, 23*b* are generated by the behaviour simulation code 30 in response to user inputs received from the user 8 via the at least one user input device 19.

The computer system 20 is embodied in the lighting system 1 itself in some embodiments. For example, a processor 21 of the computer system 20 may be a component of the bridge 10 or user device 7, or in the case of multiple processors 21, at least one may be part of the bridge 10 and at least one may be part of user device 7. Alternatively or in addition (one of) the processor(s) 21 may be part of a luminaire 4, or control device 5. In general the processor(s) 21 can be embodied in one or more devices of the lighting system 1 (in a single device, or distributed across multiple devices) in any manner that permits execution of the behaviour simulation code 30 whether distributed or localized to implement its functionality.

The input device 19 may, for example, be a component of the user device 7 (e.g. an input device of the types described above in relation to the user device 7) and may or may not part of the same device as the at least one processor 21 (e.g. the at least one processor 21 may be a component of the bridge 10, and the input device 19 a component of the user device 7, or a separate-standalone device).

The computer storage 24 comprises a computer storage device or multiple storage devices (which may be collocated, or geographically distributed); for example one or more magnetic storage devices and/or one or more solid state storage devices. This/they may be integrated in, say, the user device 7, the bridge 10, or it/they may be external devices. The computer storage 24 can also be distributed, e.g. it may comprise multiple storage devices at different locations (e.g. in the bridge 10 and user device 7 respectively).

Alternatively, at least part of the computer system 20 may be implemented externally of the lighting system 10. For example, the at least one processor 21 may be a component of a server device, or in the case of multiple processor 21 multiple server devices (e.g. two or more interconnected server devices, which may or may not be spatially located, e.g. which may be in the same or different datacentres). For example, the computer system 20 may be part of a cloud computing system ("cloud"), wherein at least one virtual machine runs on each processor 21 of the computer system 20, and the lighting system management code 20 run on the virtual machine(s). The external computer system 20 (or the external part thereof) can communicate with the lighting system 1 via an external data network, such as the Internet, via the second network node 9. In some cases, part of the computer system 20 may be embodied by the lighting system 1, and part may be implemented externally in this manner.

FIG. 2 shows a plan view of an environment 2 in which the lighting system 1 is installed. The example environment 2 is a home, e.g. a house or flat, or part of such a home.

The environment 2 comprises multiple rooms, namely a living room and adjacent kitchen to the top of FIG. 2; a bathroom to the left; two bedrooms (master and twin) towards the bottom; and a central hallway connecting all of these rooms, with entrances connecting the living room, bathroom, and two bedrooms to the hallway directly. A number of control devices 5*ab*, 5*c*, . . . , 5*i* of the lighting control apparatus 3 are shown located at various placed in the environment: control devices 5*g* and 5*f* are switch units integrated in luminaires 4*g* and 4*f*, which are bedside lamps located in the master bedroom; the remaining control devices are wall panels, mounted at various locations in the environment 2.

The living room comprises two sets of luminaires: ceiling-mounted luminaires 4*a*, and wall washers 4*b*. These two sets are independently controllable via wall-panel 5*ab* located on a wall of the living room, i.e. illumination settings can be applied to the ceiling luminaires 4*a* and wall washers 4b independently of each other, using wall panel 5ab. In the simplest case, this means they can be switched on and off independently of each other; in more sophisticated lighting systems, it may also be possible to adjust their respective dimming settings and/or colour settings independently, and in some cases may also exert a level of independent control within each set of luminaires (e.g. tune the colour of one of the ceiling luminaires 4a independently of the other ceiling luminaires 4a).

Luminaires 4c in the kitchen can be controlled via wall panel 5c on a kitchen wall. In the hallway, three wall panels 5e are shown, located near the entrances to the living-room and each of the bedrooms, any one of which can be used to control luminaires 4e located in the hallway. Likewise, wall panels 5d, 5h, 5i are located in the bath room, master bedroom and twin bedroom respectively, for controlling luminaires 4d, 4h, 4i located in those rooms respectively.

Figure 3:
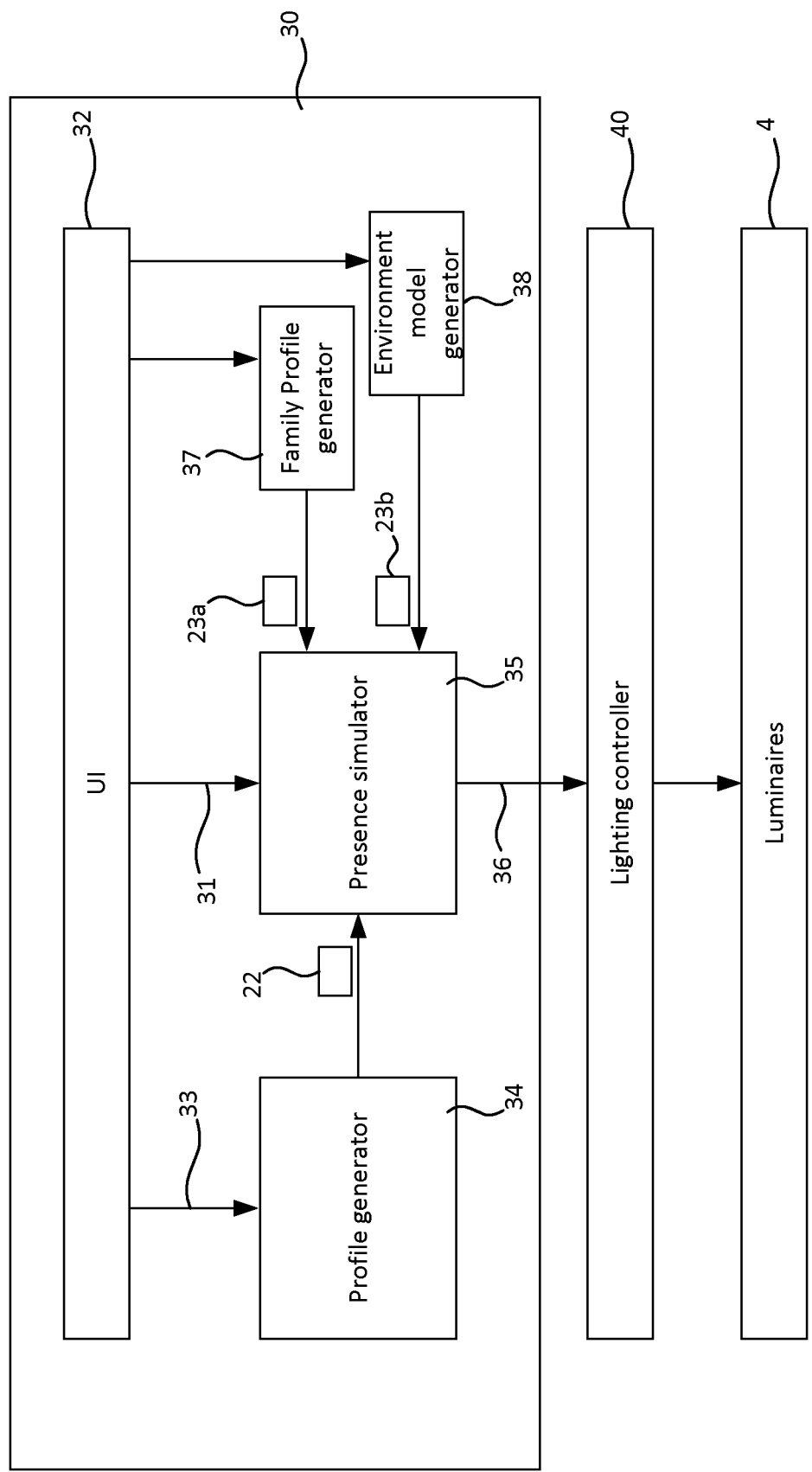
FIG. 3 shows functional modules of a presence simulation system.

FIG. 3 shows a function block diagram, wherein various functional modules of the behaviour simulation code 30 are shown, namely a user interface 32, a profile generator 34, a presence simulator 35, a family profile generator 37, and an environment model generator 38. Each of these functional modules 32, 34, 35, 37, 38 represents a respective part of the functionality of the behaviour simulation code 30 when executed on the at least one processor 21.

The user interface 32 cooperates with the at least one user input device 19, to receive and interpret user inputs from the user 8. This includes profile creation inputs 33, which are received from the user for controlling operations of the profile generator 34.

The profile generator 34 is configured to generate at least one virtual occupant profile 22 (e.g. 22(i), 22(ii)), according to the profile creation inputs 33 i.e. as specified by the user 8. Each virtual occupant profile 22 comprises user-defined virtual occupancy identity data. This may be defined explicitly by the profile creation input 33, or the profile creation inputs 33 may identify an addressable memory location holding existing data from which the user-defined identity data can be derived. For example, the existing data be (part of) a social network profile, which allows the profile creation process to be simplified.

In the following examples, it is assumed that multiple virtual profiles 22 are generated, corresponding to the user's family members. However, this is exemplary, and the techniques are not limited to this scenario (for example, the same system can be used to simulate the behaviour of a single user living alone, based on a single virtual occupant profile, or multiple virtual occupants of cohabiting roommates etc.)

FIG. 4 shows an example virtual occupant profile 22, which comprises the virtual occupant identify data 62, and an associated virtual occupant identifier 52. Each virtual occupant profile 22 comprises such a virtual occupant identifier 52, thereby distinguishing that profile from any other virtual occupant profiles.

The virtual occupant identity data 62 in each virtual occupant profile 22 defines a virtual persona, and for example:

A child in pre-school/primary school/college, etc.
A worker office/shift/, in part/fulltime/weekend work etc.
A stay-at-home person (e.g. a parent, retired person, unemployed person);
etc., which may for example be selected from a set of default virtual occupant identity options.

The user can then further adjust the virtual personas to better fit the real occupants, for example by modifying the virtual occupant identify data 62 to indicate:

The virtual occupant has regular/irregular working hours,
The virtual occupant is less active/active/very active in free time,
The virtual occupant is an "early bird" or a "night owl",
Age
Gender etc.

These personas, i.e. the virtual occupant profiles 22, are at used by the presence simulator 35 to simulate the daily life of the family, at times when the environment 2 is unoccupied, e.g. taking into account whether it is a weekday or weekend.

A mimic instruction 31 causes the lighting system 1 to switch from a (regular) manual mode of operation to a presence simulation mode. The mimic instruction 31 may be instigated manually via the user interface 32 as indicated in FIG. 3, or alternatively it may be instigated automatically based on "geo-fencing", i.e. such that when all (real-world) occupants are detected to have left the environment 2, the presence simulation mode is enabled automatically and when he returns home, it is disabled automatically. This can be implemented using a suitable sensor or sensors, e.g. optical or audio sensors to detect the presence of the real-world occupants, or a wireless receiver that is used to track (say) the location of the occupants' phones.

As indicated above, the presence simulator 35 applies an AI behaviour simulation algorithm to the identity data in the virtual occupant profiles 22, to determine when the individual virtual personas are at home, what they are doing when they at home and which room of the house they are using (note this determination refers to the virtual occupants, not real-world people). This is based not only on the virtual occupant profiles 22, but also on the model of the environment 23b and a current time measurement (e.g. time of day), which is generated by the environment model generator 38 based on details of the environment 2 inputted previously by the user 8 via the user interface 32.

Additionally, the virtual occupant profiles 22 and environment model 23b are used by the presence simulator 35 to simulate movement between the rooms over time, where the presence simulator 35 is configured such that a virtual occupant can only be in one room at any one time.

The environment model 23b is used as a basis for simulating activity in the modelled environment. For each "occupied" room, i.e. currently occupied by one or more virtual occupants, the presence simulator selects one or more activities for the virtual occupant(s) in that room.

For example, the environment model 23a may denote a type of at least one room of the environment model 23b. When "occupied" by one or more virtual occupants, the presence simulator 35 can select an activity associated with that type of room.

The selected activity for a given room may be, for example:

Eating breakfast
Eating dinner
TV watching
Reading
Relaxing
Playing
Visit bathroom/toilet
Sleeping etc. This takes into account a current time of day, and may also take into account additional timing information, such as whether or not it is currently a weekday or a weekend.

The room type can be used to map activity of a persona to a room. For example: a virtual child playing creates activity either in a child bedroom or a living room. Virtual TV-watching parents creates activity in the Living room, etc.

Consumer Lighting Systems, such as Philips Hue systems, can already be configured with a room setup of the house for easier control and configuration of the lights, which may be stored at the bridge 10. In addition to the room setup, the user can assign the usage type of the room like Living Room, Kitchen, Bedroom, Kids Bedroom, in order to generate the environment model 23*b*. The user 8 can also apply further customization the environment model 23*a* further, via the user interface 32, in order to provide a richer source of occupancy information for use in the behaviour simulation.

FIG. 4 also shows an example environment model 23*b*, which comprises layout data 66*a* and associated lighting system location data 66*b*. For example, for the environment of FIG. 2, the layout data 66*a* may describe the room layout, and the lighting system location data 66*b* may define the locations of the luminaires 4 and/or control devices 5. E.g. in the simplest case, the layout data 66*a* may be a set of room identifiers, and the layout data 66*b* may be a set of luminaire identifiers and/or control device identifiers associated with respective ones of the room identifiers. A more advanced model 23*b* may include, say, (x,y) or (x,y,z) data defining structure within the environment and the (x,y) or (x,y,z) locations of the luminaires 4 and/or control devices 5 or any other form of positioning (e.g., compass model, angular, descriptive: e.g. "left top" etc.).

The environment model 23*b* is associated in the electronic storage 24 with the virtual occupant profiles 22, as denoted by the dotted line on the right-hand side of FIG. 4.

Based on the simulated room locations and activities, the presence simulator 35 generates, for each of the virtual occupants, a respective sequence of simulated control actions 36 over time, which is used to drive a lighting controller 40 of the lighting system 1. Each of the control actions corresponds to an action that could realistically be performed by that virtual occupant given their current location and activity; it causes a change in at least one illumination setting that is applied to at least one of the luminaires 4, thereby causing a change in at least one characteristic of its/their emitted light.

In the simplest case, these may be on-off control actions which switch luminaires (or sets of luminaires) on or off. However, in some cases, the control actions may be more advanced, e.g. they may change dimming levels, colour characteristics, or even directionality of the emitted light (e.g. by rotating, widening or narrowing an emitted beam).

Besides setting individual occupant profiles 22, the user can also create and edit the family profile 23*a*, for example by indicating in the family profile 23*a* whether the family spends a lot or only few times together (joined diners/breakfasts, joined activities etc.), by setting one or more family characteristics 64 in the family profile 23*a*. The family characteristic(s) 64 are used in determining the simulated behaviour for all of the virtual occupant profiles 22 associated with it, i.e. in determining the sequence of control actions for each associated virtual occupant. The family profile 23*a* is generated by the family profile generator 37, according to user inputs received via the user interface 32.

For example, the user may define three virtual occupant profiles 22 corresponding to himself and the rest of his family:
Adult 1: early bird, office worker, part-time
Adult 2: night-owl, office worker, full time
Child 1: primary school He can then define an associated family profile 23*a* associated with the three profiles, which defines the family as active (e.g. as prone to moving about a lot rather than sitting around watching TV) and close (i.e. as prone to spending a lot free time together as a family).

Note that, whilst in many contexts, a user may wish to match the virtual occupant profiles to match the identities of real-world people, this is not a requirement. For example, it may be desirable to simulate presence in an uninhabited environment using entirely fictitious virtual occupant profiles.

Additionally, in some embodiments, once the virtual occupant profiles 22 have been created by the user 8, the user-define virtual occupant identity data therein can refined, by the system learning from the usage of the connected lighting system 1 by the real-world occupants when present. Based on the personas that a user has created, his usage of the lighting system is measured. This data can be entered into a learning system to derive typical patterns. Those patterns can then be used to enhance the simulation of all personas.

Simulation games, such as 'The Sims' already can perform simulation of activities of interacting personas during the day in a modelled environment. Such simulations can be used by the presence simulator 35 to create input for the lighting controller 40 where the input (room, activity) can be translated to an illumination setting(s) in this room.

The lighting controller 40 can for example be implemented at the bridge 10, at the user device 7, at one of the dedicated control devices 5, or at one of the luminaires 4; or the lighting controller 40 may comprise a plurality of lighting control units distributed across two or more such devices. Alternatively, the lighting controller 40 may be implemented at the luminaires 4 (e.g. it may comprise a plurality of lighting control units, each of which is a component of a respective one of the luminaires 4), for example in the case that the luminaires are controlled directly via Bluetooth or Wi-Fi. The lighting controller 40 can be implemented in software (i.e. as code executed on a processor or processors of the device or devices in question, for example low-level software like firmware and/or higher level application software), or in hardware (e.g. using application-specified integrated circuitry and/or FPGA(s)), or using a combination of hardware and software. In general, the lighting controller 40 can be any suitable control apparatus, localized or distributed, which is configured to respond to the sequence of simulated control actions 35 accordingly.

Note, the terms "luminaire", "light source", "light" (when referring to a device) and "illumination source" are used interchangeably, to refer to a device which emits not just any light, but specifically illumination, i.e. light on a scale suitable for contributing to the illuminating of an environment occupied by one or more humans (so that the human occupants can see within the physical space as a consequence). A basic luminaire may consist simply of a light bulb or bulbs (e.g. LED, a filament bulb or gas-discharge lamp) and any associated support structure. Other luminaires may also comprise, for example, an associated casing or housing though others may not. A luminaire can take the form of a traditional ceiling or wall mounted room luminaire, or free standing luminaire (such as a floor or table lamp); or it may take a less traditional form such as an LED-strip embedded in a surface or item of furniture, a wall washer, or any other form of illumination device adapted to provide illumination specifically. Components for communicating with the bridge 10 and/or lighting control apparatus 3 (e.g. dedicated application-specific circuitry, FPGA, processors and accompanying software (e.g. firmware) as applicable) may be incorporated in a light bulb with a standard fitting, to allow easy retrofitting of connected lighting functionality into existing, non-specialised lighting systems. However, this is not essential and in general these communication components can be incorporated at any suitable location in the lighting system to allow communication between the luminaires and the controller.

It will be appreciated that the above embodiments have been described by way of example only. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage.

Note that wherever it recites "at least one processor" configured to implement certain functionality, this covers not only a scenario where one processor is configured to implement all of this functionality, but also a scenario in which there are multiple processors, each of which is configured to implement only a part of this functionality, such that this functionality as a whole is implemented by the multiple processors collectively. Where there are multiple processors, these may or may not be geographically distributed.

A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A presence simulation system for creating an impression of an environment, comprising at least one luminaire, being occupied when unoccupied, the presence simulation system comprising:
   a user interface;
   a profile generator configured to generate in electronic storage a plurality of virtual occupant profiles, each defining a virtual persona living in the environment, according to profile creation inputs received via the user interface, each virtual occupant profile comprising user-defined virtual occupant identity data and an associated virtual occupant identifier which distinguishes each of the plurality of virtual occupant profiles from each other, wherein the user-defined virtual occupant identity data in each virtual occupant profile comprises age data, employment status data, gender data, or family member data;
   a presence simulator configured to generate a sequence of simulated control actions, by applying a behaviour simulation algorithm to the user-defined virtual occupant identity data of the electronically-stored virtual occupant profiles; and
   a lighting controller configured to vary at least one characteristic of light emitted by the at least one luminaire according to the sequence of simulated control actions.

2. A presence simulation system according to claim 1, wherein the presence simulator is further configured to apply the behaviour simulation algorithm by generating a sequence of simulated activities for each virtual occupant profile using its virtual occupant identity data, and wherein the presence simulator is further configured to generate the sequence of simulated control actions based on the generated sequence of simulated activities.

3. A presence simulation system according to claim 1, wherein each simulated sequence of activities comprises:
   a simulated dining activity,
   a simulated content consuming activity,
   a simulated gaming activity,
   a simulated bathroom activity, or
   a simulated rest activity.

4. A presence simulation system according to claim 1, wherein the presence simulator is further configured to apply the behaviour simulation algorithm by generating a sequence of simulated occupant locations for each virtual occupant profile using its identity data and a model of an environment illuminated by the at least one luminaire, and wherein the presence simulator is further configured to generate the sequence of simulated control actions based on the generated sequence of simulated occupant locations.

5. A presence simulation system according to claim 4, wherein each sequence of simulated occupant locations is a sequence of occupied rooms of the environment model.

6. A presence simulation system according to claim 4, wherein the presence simulator is further configured to:
   generate, for at least a first of the virtual occupant profiles, at least one of the simulated activities in the sequence of simulated activities for the first profile based on the simulated occupant location at a corresponding time in the sequence of simulated occupant locations for the first profile.

7. A presence simulation system according to claim 6, wherein the presence simulator is further configured to generate at least one simulated activity based on the simulated occupant location for the first profile at that time and the simulated occupant location for a second of the occupant profiles at that time.

8. A presence simulation system according to claim 1, wherein the presence simulator is further configured to apply the behavior simulation algorithm by selecting, for each of a plurality of different time intervals, a respective one or more of the virtual occupant profiles, wherein the at least one light characteristic is varied during that time interval based on the respective one or more virtual occupant profiles selected for that time interval.

9. A presence simulation system according to claim 1, further comprising:
   a family profile generator configured to generate in the electronic storage at least one family characteristic in association with the plurality of virtual occupant profiles, based on which the sequence of simulated control actions is generated.

10. A computer-implemented method for creating an impression of an environment, comprising at least one luminaire, being occupied when unoccupied, the method comprising implementing by a computer system the following steps:
   generating in electronic storage a plurality of virtual occupant profiles, each defining a virtual persona living in the environment, according to profile creation inputs received from a user via a user interface, each virtual occupant profile comprising user-defined virtual occupant identity data and an associated virtual occupant identifier which distinguishes each of the plurality of virtual occupant profiles from each other, wherein the user-defined virtual occupant identity data in each virtual occupant profile comprises age data, employment status data, gender data, or family member data;

generating a sequence of simulated control actions, by applying a behaviour simulation algorithm to the virtual occupant identity data of the electronically-stored virtual occupant profiles; and causing at least one characteristic of light emitted by the at least one luminaire to be varied according to the sequence of simulated control actions.

11. A computer program product comprising code stored on a computer readable storage medium and configured when executed to implement the method of claim 10.

12. A computer system for creating an impression of an environment, comprising at least one luminaire, being occupied when unoccupied, the computer system comprising:

a profile generator configured to generate in electronic storage a plurality of virtual occupant profiles, each defining a virtual persona living in the environments, according to profile creation inputs received via a user interface, the profile comprising user-defined virtual occupant identity data, wherein the user-defined virtual occupant identity data comprises age data, employment status data, gender data, or family member data; and a presence simulator configured to generate a sequence of simulated control actions luminaire, by applying a behaviour simulation algorithm to the user-defined virtual occupant identity data of the electronically-stored virtual occupant profiles;

wherein the computer system is configured to cause at least one characteristic of light emitted by the at least one luminaire to be varied according to the sequence of simulated control actions.

\* \* \* \* \*